Patented Oct. 24, 1922.

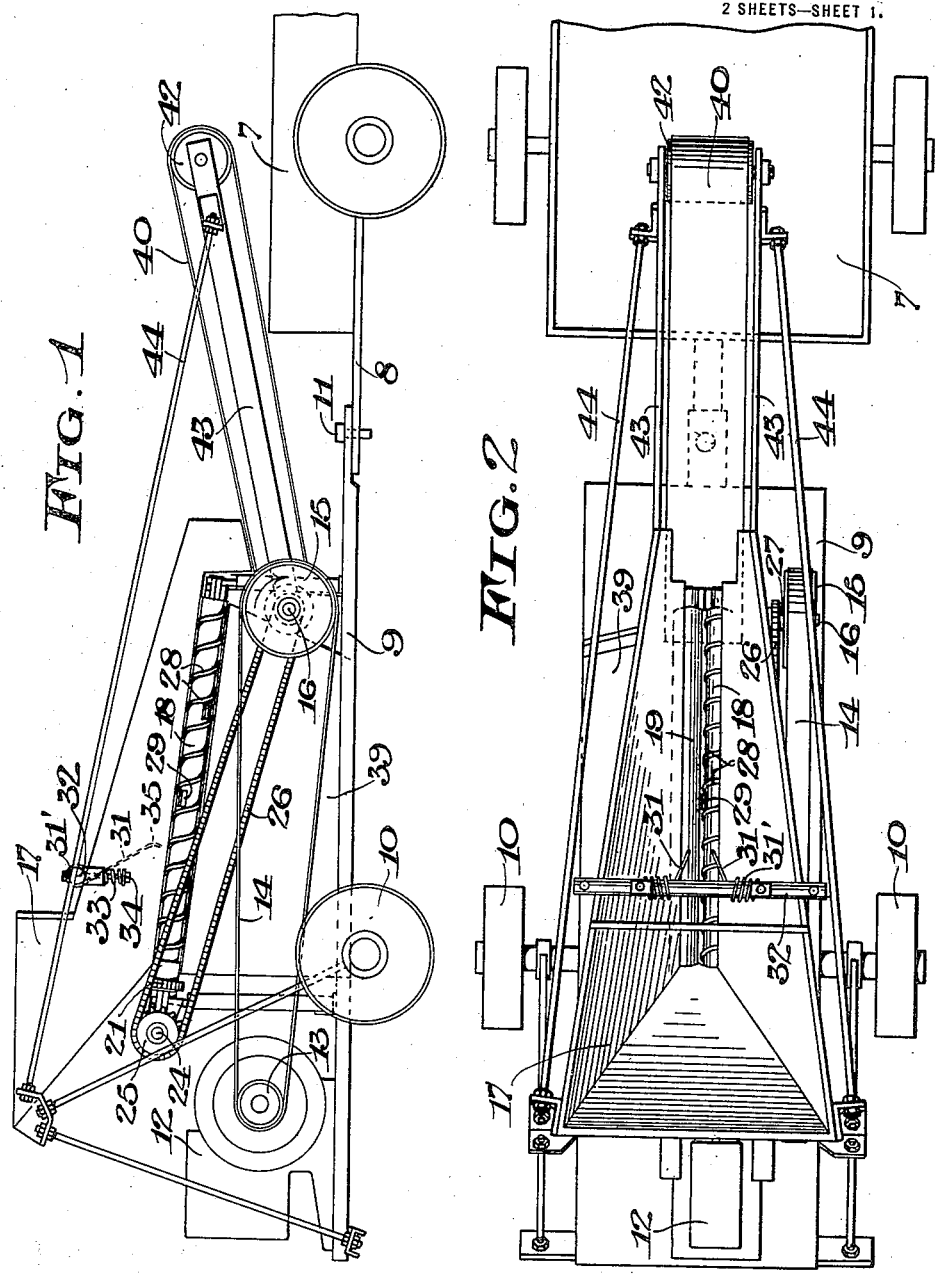

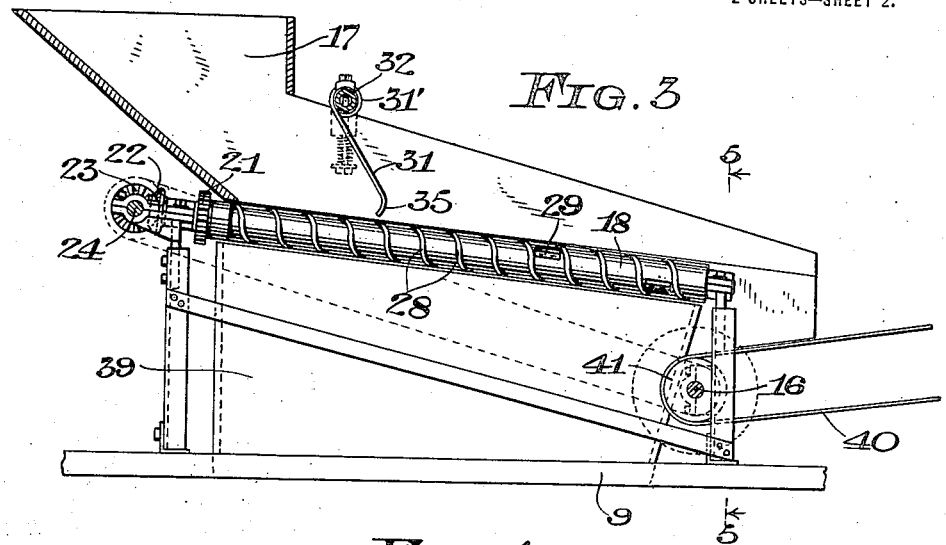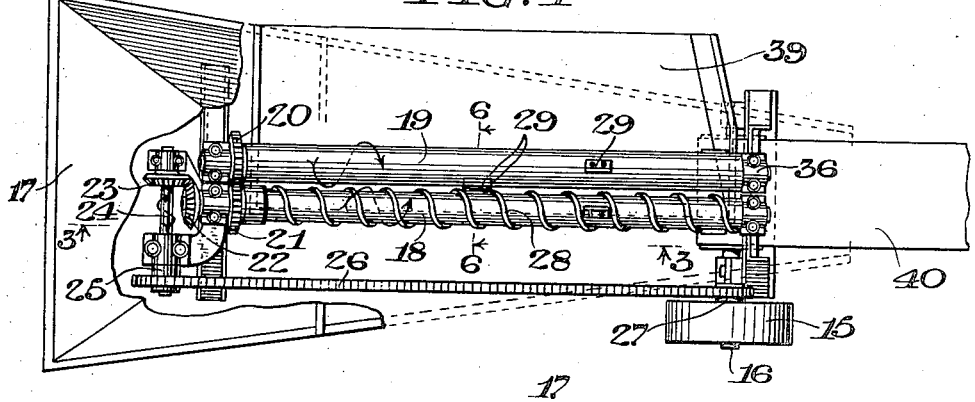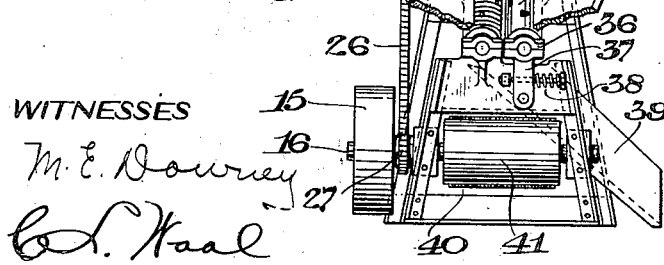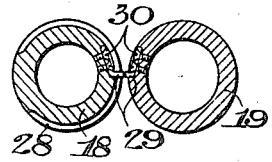

1,432,912

UNITED STATES PATENT OFFICE.

JOHN SCHOLL AND RICHARD PARLOW, OF BELGIUM, WISCONSIN.

BEET-TOPPING MACHINE.

Application filed October 26, 1921. Serial No. 510,515.

*To all whom it may concern:*

Be it known that we, JOHN SCHOLL and RICHARD PARLOW, citizens of the United States, and residents of Belgium, in the county of Ozaukee and State of Wisconsin, have invented new and useful Improvements in Beet-Topping Machines, of which the following is a description, reference being had to the accompanying drawings, which are a part of this specification.

The invention relates to beet-topping machines.

The object of the invention is to provide a beet-topping machine in which the tops are severed or removed from the beets during their passage along a pair of rollers, and more particularly a portable machine, for use in the field, in which machine the rolls are at the bottom of a hopper into which the beets are loaded and from which the topped beets are carried to a wagon.

The invention further consists in the several features hereinafter set forth and more particularly defined by claims at the conclusion hereof.

In the drawings: Fig. 1 is a side elevation view of a device embodying the invention; Fig. 2 is a plan view thereof; Fig. 3 is a detail sectional view taken on the line 3—3 of Fig. 4; Fig. 4 is a detail plan view, parts being broken away; Fig. 5 is a detail sectional view taken on the line 5—5 of Fig. 3; Fig. 6 is a detail sectional view through the rolls taken on the line 6—6 of Fig. 4.

In the drawings, the numeral 7 designates a wagon provided with a draw-bar 8 to which a frame 9, supported at its rear on wheels 10, is coupled by a king bolt 11.

The frame 9 has an engine 12 mounted thereon whose drive pulley 13 is connected by a belt 14 to a pulley 15 on a shaft 16.

A hopper 17 is mounted on the frame and topping rolls 18 and 19, preferably supported on an incline, are located at the bottom of the hopper. These rolls 18 and 19 are connected together by gears 20 and 21 to rotate in opposite directions, and the roll 18 is driven from the shaft 16 by a gear 22 on said roll meshing with a gear 23 on a shaft 24 carrying a sprocket 25 connected by an endless chain 26 with a sprocket 27 on the shaft 16.

The roll 18 is provided with a helical feeding rib 28 so as to insure the feed of the beets along the rolls, and both rolls are provided with a plurality of sets of knives 29 detachably secured to the rolls in any suitable manner, as by screws 30. These knives are positioned on the rolls so as to have the knives of each set adjacent each other during the rotation of the rolls, as indicated in Figs. 4 and 6. With this construction the freshly pulled beets are introduced into the upper end of the hopper and as they pass down along the rolls the tops are cut or torn off by the knives 29.

In order that the tops may be efficiently acted upon, we provide a plurality of spring fingers 31 whose upper coiled ends 31' are secured to a shaft 32 mounted on the hopper and capable, in case the beets jam, of moving upwardly against the action of springs 33 interposed between the frame of the machine and the heads of the bolts 34 passed through the shaft. The lower ends 35 of these fingers are inclined toward the upper end of the hopper and normally stand just above the rolls 18 and 19 and catch the leaves of the beets as they pass by and straighten out these leaves so that they may be drawn in between the rolls and be cut or torn off from the head of the beet by the knives 29.

In order to prevent breakage of the rolls when loose rock or other foreign material clinging to the pulled beets gets in between the rolls, the journals 36 for the roll 19 are mounted on swinging arms 37 which are yieldingly held in an operative position by means of springs 38, said springs permitting the arms to swing to separate the rolls 18 and 19.

The tops of the beets fall onto an inclined chute or discharge trough 39 while the topped beets are delivered to a belt 40 which carries them to the wagon 7 into which they are discharged from the upper elevated end of the belt. The belt 40 runs over a roller 41 on the shaft 16 and a roller 42 journalled in upwardly inclined frame members 43 which may be secured in operative position by the rods 44.

The term "hopper" in this specification has been used to include what might be termed a chute in which the topping rolls are disposed.

The apparatus above described is convenient for use in the field. The pulled beets are thrown into the hopper 17 and topped and transferred to the wagon 7 and the machine moved along the field to keep pace with the harvesters.

We desire it to be understood that this invention is not to be limited to any specific form or arrangement of parts except in so far as such limitations are specified in the claims.

What we claim as our invention is:

1. In a beet-topping machine, the combination with a hopper, of a pair of rolls at the bottom thereof along which the beets are fed, said rolls being spaced a short distance apart to receive the tops of the beets, topping knives carried by said rolls, means for rotating said rolls in opposite directions, and top straightening fingers spaced from said hopper and disposed adjacent the rolls near the upper end of the hopper.

2. In a beet-topping machine, the combination of a hopper, a pair of oppositely rotating topping rolls at the bottom of the hopper along which the beets pass, one of said rolls having a helically extending feeding rib and the other being plain, and topping knives carried by said rolls and spaced at intervals along said rolls.

3. In a beet-topping machine, the combination with a hopper, of a pair of topping rolls at the bottom thereof along which the beets are fed, said rolls being spaced a short distance apart to receive the tops of the beets, topping knives carried by said rolls, means for rotating said rolls in opposite directions, and top-straightening spring fingers disposed adjacent the rolls near the upper end of the hopper.

4. In a beet-topping machine, the combination with a hopper, of a pair of spaced topping rolls at the bottom thereof along which the beets are fed, topping knives carried by said rolls, means for rotating said rolls in opposite directions, and yieldingly mounted top-straightening fingers disposed adjacent the receiving ends of said rolls.

5. In a vegetable topping machine, the combination, with a hopper, of a pair of spaced rolls at the bottom thereof along which the vegetables are fed, means for rotating said rolls in opposite directions, and yieldable top-straightening fingers disposed slightly above the rolls.

6. In a vegetable topping machine, the combination with a hopper, of a pair of spaced rolls at the bottom thereof along which the vegetables are fed, means for rotating said rolls in opposite directions, and top-straightening spring fingers depending into the hopper with their lower ends terminating slightly above the rolls and inclining toward the receiving end of said hopper.

7. In a vegetable topping machine, the combination, with a hopper, of a pair of spaced rolls at the bottom thereof along which the vegetables are fed, means for rotating said rolls in opposite directions, a transversely disposed member yieldingly mounted above the receiving ends of the rolls, and spring fingers having coiled portions secured to said member and their free ends depending down into the hopper and terminating slightly above said rolls.

In testimony whereof we affix our signatures.

JOHN SCHOLL.
RICHARD PARLOW.